Oct. 28, 1952     A. G. GOODNIGHT     2,615,405

DISPENSING UTENSIL

Filed Aug. 12, 1949

INVENTOR.
AUSTIN G. GOODNIGHT
ATTORNEYS

Patented Oct. 28, 1952

2,615,405

UNITED STATES PATENT OFFICE 2,615,405

DISPENSING UTENSIL

Austin G. Goodnight, Laton, Calif.

Application August 12, 1949, Serial No. 109,895

6 Claims. (Cl. 107—48)

The present invention relates to dispensing utensils or dippers and more particularly to a trigger actuated dipper for ice cream and the like.

Ice cream is conventionally stored in cylindrical tubs and containers from which it is subsequently dipped for serving. When the ice cream is hard, it is extremely difficult by means of conventional dippers to dispense the ice cream. Waste occurs because of the difficulty of completely extracting all of the ice cream from such containers, conventional dippers being of a configuration unable to reach into the corners completely to clean the same.

Ice cream dippers conventionally employ a rack and pinion system for motivating a sweep in dislodging ice cream contained by the dippers. The rack and pinion are difficult to clean and subject to maladjustment when employed in hard ice cream. Further such dippers do not accommodate a normal hand position for an operator thereof and thus fatigue is experienced in continued employment thereof.

An object of the present invention is to provide an improved dipper for dispensing ice cream and the like from containers onto ice cream cones, dishes, and other serving aids.

Another object is to provide a dipper suited to continued operation for extensive periods without fatiguing the operator thereof.

Another object is to provide an ice cream dipper in which the hand of the operator may be held in a more advantageous attitude during use than possible while operating conventional dippers.

Another object is to provide an ice cream dipper in which the dipper is filled by endward movement thereof precluding excessive strains on the dipper and breakage thereof.

Another object is to provide a dipper for ice cream and the like that is simple in form, dependable in operation, and that provides a minimum of moving parts subject to maladjustment.

Further objects are to provide improved elements and arrangements thereof in a device for serving ice cream that is simple to operate, economical to manufacture, and rugged in its construction.

Still further objects and advantages will become apparent in the subsequent description in the specification.

Figures 1, 2, 3:
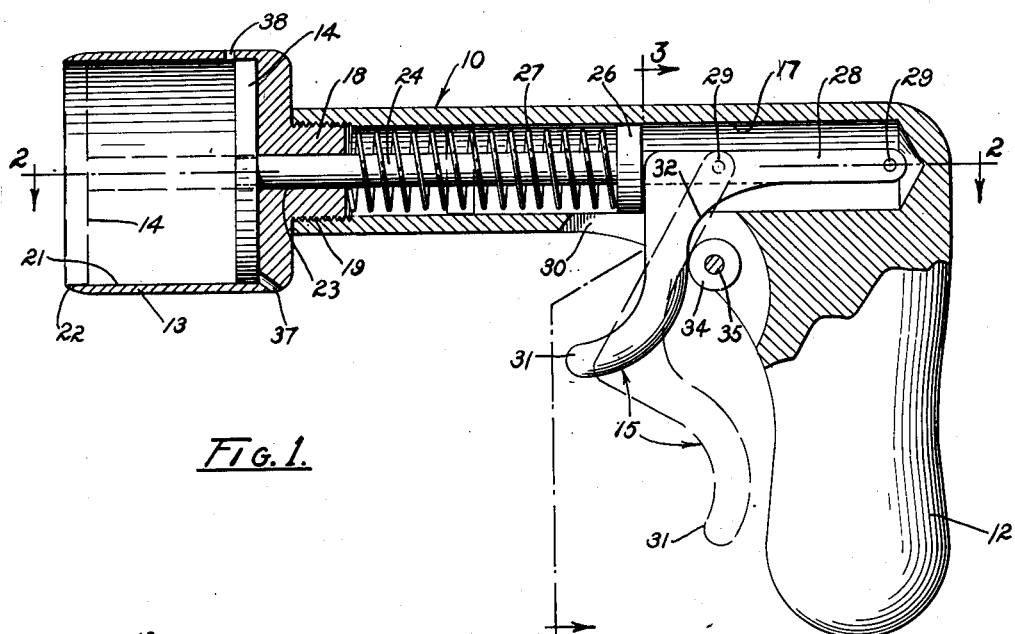
Fig. 1 is substantially a longitudinal, vertical, sectional view through an ice cream dipper disclosing the principles and construction of the present invention, with a segment of a handle portion thereof shown in elevation.
Fig. 2 is a longitudinal sectional view taken axially through the upper portion of the ice cream dipper, as along line 1—1 in Fig. 1.
Fig. 3 is a vertical transverse sectional view through the ice cream dipper, as taken on line 2—2 of Fig. 1.

Referring in greater detail to the drawing, the dipper of the present invention is provided with a body portion indicated generally by the reference numeral 10 having an integral downwardly extending pistol grip 12 and a cylindrical head or scoop portion 13 secured at the end of the body opposite to the grip, arbitrarily designated the forward end. A disc shaped ejecting plunger 14 is mounted for longitudinal slideable movement in the head of the body, and an operating lever 15 provided for actuating the ejecting plunger in forcibly discharging ice cream, or the like, from the head or scoop portion 13. The lever 15 is operated in a manner similar to the trigger of a pistol in actuating the ejecting plunger 14, all as will subsequently become more fully apparent. If desired, the end of the plunger may be of concave form to impart a rounded top to ice cream vended thereby or bear embossed or indented legends, trade-marks or the like.

The body 10 of the dipper has a cylindrical bore 17 formed longitudinally therein from the forward end and a nipple 18, extended coaxially from the head 13, is screw threadedly received in the forward end of the bore 17, as indicated at 19. The outer end of the cylindrical head 13 is counter-bored coaxially of the bore 17 of the body to define a cylindrical cup portion 21 for containing a predetermined quantity of ice cream or the like to be scooped and dispensed by the dipper. The peripheral edge 22 of the cup portion of the head 13 is sharpened for easy entry into ice cream or other material.

A cylindrical opening 23 is formed coaxially through the nipple portion of the head 13 in alignment with the bore 17 and slideably receives a cylindrical stem portion 24 axially extended from the plunger 14, rearwardly in the bore. The rearward end of the stem 24 is guided coaxially of the bore 17 by securing a collar 26 to the stem 24 intermediate its ends and slideably fitting the collar to the bore. A helical compression spring 27 is located under initial compression between the collar 26 and the nipple 18 in circumscribing relation to the stem 24 and serves yieldably to maintain the plunger 14 in retracted position in the cup 21, as shown in Figs. 1 and 2.

The plunger 14 is manually moved to ejecting position by means of the operating lever 15. The operating lever is substantially of ogee form with an upper portion bifurcated to a pair of spaced legs 28. These legs 28 lie on opposite horizontal sides of the stem 24 and are pivotally connected thereto, as at 29. The operating lever 15 extends through an elongated slot 30 formed in the body portion 10 of the dipper from the exterior of the body portion to the bore 17 adjacent to its inner end. The forward and lower terminal end of the operating lever is arcuately forwardly extended in a trigger portion 31 so that the operating lever may be manually operated for ejection purposes. The rear underside of the operating lever 15 is formed with an arcuate guide portion 32 and a roller 34 is rotatably mounted in engagement therewith in the slot 30 by means of a pin 35 extending through the body 10 and the roller 34. During manual operation of the operating lever 15 for ejection of the contents of the cup 21 the arcuate guide portion 32 of the operating lever rides on the roller 34 translating downward and rearward movement of the trigger portion 31, as viewed in Fig. 1, into longitudinal movement of the plunger 14 to bring the plunger into substantial transverse end alignment with the head 13. To facilitate reciprocal positioning of the plunger 14, it has been found advantageous to port the rear of the cup 21, as at 37. Further, a breathing opening 38 may be formed through the side wall of the cup 21 forward of the retracted position of the plunger 14, to facilitate cup loading in even the hardest frozen and compacted ice cream.

The various elements or parts of the dipper such as the body 11, head 13, the plunger 14, and the operating lever 15 are adapted to be constructed of metals, such as stainless steel, aluminum or magnesium alloys, plastics, and the like by molding or die casting processes. This form of construction is economical and excellently suited to the purpose. It is to be understood, however, that the device may be formed of any desired material and by fabrication or other processes without departing from the spirit or scope of the invention.

Operation

The operation and utility of the present invention is believed to be apparent from the foregoing description and is briefly summarized at this point. In using the ice cream dipper, the pistol grip 12 of the body 10 is grasped by the operator in a manner similar to a pistol and the head portion 13 is inserted into the ice cream or other material to be dispensed until the cup portion 21 of the head is completely filled. The dipper is thereafter withdrawn removing the head of the dipper from the material while maintaining a full measure of the material within the cup portion 21. The dipper is located with the cup portion 21 thereof over or adjacent the position that the contents is to be dispensed and the operating lever 15 is moved downwardly and rearwardly by simple squeezing actuation. When the operating lever 15 has been moved to the dash line position, as shown in Fig. 1, the plunger 14 is located flush with the outer end of the head 13 (or cup 21) with the material previously contained ejected from the dipper.

During the actuation of the operating lever 15 from its rest position, as shown in full lines in Fig. 1, to the ejecting position, as shown in dash lines in the same figure, the arcuate guide portion 32 rides on the roller 34, as a relatively movable fulcrum, and the stem 24 and the plunger 14 are moved into material ejecting position. Thus, the shape of the arcuate guide portion 32 controls the relative movement between the operating lever 15 and the plunger 14 during the ejecting operation. The relative movement of the lever and its fulcrum provides the greatest mechanical advantage for the operator during the maximum movement of the lever. This is to aid in compacting ice cream into ice cream cones, and the like.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and structures.

Having described my invention, what I claim as new and desire to secure by Letters Patent is:

1. A dipper comprising an elongated body having a substantially cylindrical enlarged head end and an opposite grip end, the head end having a coaxial substantially cylindrical cup formed therein, a plunger mounted in the cup for slideable movement longitudinally thereof, resilient means urging the plunger into retracted position within the cup, an operating lever pivotally connected to the plunger and extended from the body adjacent to the grip for manual operation, said lever having an elongated edge disposed toward the grip, and a roller rotatably mounted on the body intermediate the lever and the grip in engagement with the elongated edge of the lever and providing a rolling fulcrum for the lever.

2. A dipper comprising an elongated substantially cylindrical body having a forward end, a rearward end, a hollow cylindrical head at the forward end, and a pistol grip at the rearward end; a plunger slideably mounted in the hollow of the cylindrical head and having a stem slideably extended rearwardly in the body; an operating lever pivotally connected to the stem of the plunger and extended from the body forwardly adjacent to the pistol grip said lever having an arcuate concave camway formed thereon disposed toward the grip; and a roller rotatably mounted in the body adjacent to the operating lever in engagement with the camway thereof and providing a rolling fulcrum for lever operation.

3. A dipper comprising an elongated cylindrical body portion having a forward end, a rearward end, a coaxial bore formed longitudinally thereof from the forward end to a position short of the rearward end, and a pistol grip extended from the rearward end; a head secured to the forward end of the body having a cylindrical cup formed therein in substantial alignment with the body and a bore in alignment with the bore of the body; a plunger mounted in the cup for longitudinal slideable movement having a stem slideably received in the bores of the head and the body; an operating lever pivotally connected to the stem of the plunger and extended from the body in trigger relation to the pistol grip, said lever having a rearwardly disposed arcuate edge; a roller rotatably mounted in the body in engagement with the arcuate rearward edge of the lever and providing a roller fulcrum for the lever; and means yieldably urging the plunger into retracted position within the cup.

4. An ice cream dipper comprising an elongated body portion having a forward end, a rearward end, a bore formed longitudinally thereof from the forward end to a position short of the rearward end, a head at the forward end having a cylindrical cup formed therein in substantial alignment with the bore, and a pistol grip extended from the rearward end; a plunger mounted in the cup for longitudinally slideable movement having a stem slideably received in the bore; an operating lever pivotally connected to the stem adjacent to the grip, forwardly extended along the stem in the bore and thence outwardly from the body portion in trigger relation to the grip providing a rearwardly disposed arcuate concave edge; a roller rotatably mounted in the body portion in engagement with the arcuate concave edge providing a rolling fulcrum for the lever; and resilient means housed in the bore urging the stem and plunger rearwardly of the body portion.

5. An ice cream dipper comprising an elongated body having a forward end providing an endwardly disposed cup, a rearward end, and a pistol grip extended from the rearward end obliquely to the body; a plunger mounted in the cup and shiftable therein for ejecting contents thereof having a stem extended longitudinally in the body; an operating lever pivotally connected to the stem of the plunger and extended therefrom in trigger relation to the grip, said lever having an edge disposed toward the grip; and a fulcrum member in the body rearwardly adjacent to the grip positioned for engagement by the edge of the lever and longitudinal travel of the lever thereacross during movement of the lever toward and from the grip.

6. An ice cream dipper comprising an elongated body having a forward end providing an endwardly disposed cup, a rearward end, and a pistol grip extended from the rearward end obliquely to the body; a plunger mounted in the cup and shiftable therein for ejecting contents thereof having a stem extended longitudinally in the body terminating adjacent to the grip; resilient means urging the plunger and stem rearwardly in the body; a fulcrum member mounted in the body forwardly of the grip; and an elongated lever pivotally connected to the rearward end portion of the stem and forwardly extended across the fulcrum member in trigger relation to the grip, said lever having a rearwardly disposed edge engaged with the fulcrum member and longitudinally traveled thereacross during pivotal movement of the lever toward and from the grip.

AUSTIN G. GOODNIGHT.

REFERENCES CITED

The following references are of record in the file of this patent:

UNITED STATES PATENTS

| Number | Name | Date |
| --- | --- | --- |
| 869,879 | Cameron | Nov. 5, 1907 |
| 1,526,753 | Levene | Feb. 17, 1925 |
| 1,583,072 | Landman | May 4, 1926 |
| 1,710,397 | Bach | Apr. 23, 1929 |
| 1,805,387 | Balton | May 12, 1931 |